(12) United States Patent
Haimi

(10) Patent No.: US 8,213,330 B2
(45) Date of Patent: Jul. 3, 2012

(54) MANAGING MOBILE TELECOMMUNICATIONS PACKET DATA SERVICE TRAFFIC IN REAL-TIME

(75) Inventor: Vesa Haimi, Vantaa (FI)

(73) Assignee: IP Tune Oy, Vantaa (FI)

( * ) Notice: Subject to any disclaimer, the term of this patent is extended or adjusted under 35 U.S.C. 154(b) by 342 days.

(21) Appl. No.: 12/570,192

(22) Filed: Sep. 30, 2009

(65) Prior Publication Data

US 2010/0080140 A1    Apr. 1, 2010

(30) Foreign Application Priority Data

Sep. 30, 2008    (FI) ...................................... 20085923

(51) Int. Cl.
*H04L 12/26* (2006.01)

(52) U.S. Cl. ..................... 370/252; 370/315; 370/474

(58) Field of Classification Search ................. 370/252, 370/315, 474
See application file for complete search history.

(56) References Cited

U.S. PATENT DOCUMENTS

| | | | |
|---|---|---|---|
| 7,062,268 B2* | 6/2006 | McKenna | 455/431 |
| 7,869,352 B1* | 1/2011 | Turner et al. | 370/229 |
| 8,010,082 B2* | 8/2011 | Sutaria et al. | 455/408 |
| 8,015,291 B2* | 9/2011 | Chapman et al. | 709/226 |
| 2006/0015576 A1* | 1/2006 | Seo et al. | 709/219 |
| 2009/0006584 A1* | 1/2009 | Gregoire et al. | 709/220 |
| 2009/0190506 A1* | 7/2009 | Belling et al. | 370/259 |

FOREIGN PATENT DOCUMENTS

| | | |
|---|---|---|
| WO | WO 03/096729 A | 11/2003 |
| WO | WO 2006/102915 A | 10/2006 |
| WO | WO 2008/097105 A | 8/2008 |

* cited by examiner

*Primary Examiner* — Jason Mattis
(74) *Attorney, Agent, or Firm* — Frommer Lawrence & Haug LLP; Ronald R Santucci

(57) ABSTRACT

The invention allows managing mobile telecommunications packet data service traffic. Packet data service traffic of a mobile telecommunications network is received from data collectors. The service traffic is stored in a traffic file. The traffic file is split into service specific capture files. The capture files are stored. Key information is extracted from the capture files for entry points of the network. The key information is stored in entry point specific tables.

16 Claims, 6 Drawing Sheets

MANAGING MOBILE TELECOMMUNICATIONS PACKET DATA SERVICE TRAFFIC IN REAL-TIME

This application claims priority benefits from Finnish patent application No. 20085923 filed Sept. 30, 2008, the disclosure of which is hereby incorporated by reference.

BACKGROUND OF THE INVENTION

1. Field of the Invention

The invention relates generally to management of mobile telecommunications traffic. In particular, the invention relates to methods, computer programs and apparatuses for managing mobile telecommunications packet data service traffic.

2. Description of the Related Art

Today, various kinds of traffic measurements are routinely performed on packet switched telecommunication networks as well as on circuit switched telecommunication networks. In the case of packet switched networks, these traffic measurements may contain e.g. packet headers, signaling messages, and authorization log-files. These traffic measurements may be utilized in examining the status and performance of a network, and in order to ensure the correct operation of the network. In addition, traffic analysis based on these measurements provides valuable data about user behavior and trends in application and network usage.

A prior art network management system typically comprises fault management and performance management. Fault management refers to monitoring notifications and alarms indicating status changes and detected faults, as well as evaluating their importance and effects, and initiating actions such as repairs. These notifications and alarms are generated by various network elements, operation and maintenance units, and the network management system itself. Performance management refers to collecting performance measurements from various network elements, operation and maintenance units, etc. to the network management system, and subsequently analyzing the collected data. Thus, e.g. trends and problems in the network can be detected.

The collected performance measurements typically relate to parameters which can be used to indicate the performance of the network or a network element, or a service provided by the network. The performance measurements are typically transmitted to the network management system sequentially, e.g. every 15, 30 or 60 minutes or every 12 or 24 hours, depending on the network, e.g. the network size, the amount of different kind of measurements to be collected, and the capacity of the network management system. Having received the collected performance measurements, the network management system analyzes them. Typically the analysis is performed by batch processing in which the received data is analyzed e.g. once every 24 hours.

As current networks continue to grow, faster network management including monitoring of network resources, network services and services provided over the network is needed. In particular, analysis of the collected performance measurements has proven problematic. Firstly, the current implementations typically perform the analysis as an off-line procedure, for example once every 24 hours. In other words, the analysis is not performed in real-time which may seriously degrade the performance of the network or the quality of service since performance problems may remain unattended to until the next batch processing of collected performance measurements. Furthermore, the present algorithm based analysis methods do not allow real-time decision making and monitoring either.

Therefore, an object of the present invention is to alleviate the problems described above and to introduce a solution that allows analysis and monitoring for a communications network, network resources, network services and services provided over the network in real-time.

SUMMARY OF THE INVENTION

A first aspect of the present invention is a method of managing mobile telecommunications packet data service traffic. Packet data traffic related to one or more services of a mobile telecommunications network is received from one or more data collectors. At least a portion of the received packet data traffic is stored in a traffic file. The stored traffic file is split into capture files, wherein each of the capture files is specific to one service of the one or more services of the mobile telecommunications network. The service specific capture files are stored, wherein each capture file is assigned an index. Predetermined key information is extracted from the stored service specific capture files for entry points of the one or more services of the mobile telecommunications network by utilizing one or more filters configured for searching one or more strings related to the predetermined key information, wherein the key information includes at least the index assigned to the associated service specific capture file, at least one user identification, and time data. The extracted key information is stored in entry point specific tables.

A second aspect of the present invention is an apparatus for managing mobile telecommunications packet data service traffic. The apparatus comprises a receiver configured to receive packet data traffic related to one or more services of a mobile telecommunications network from one or more data collectors. The apparatus further comprises a first storage configured to store at least a portion of the received packet data traffic in a traffic file. The apparatus further comprises a a splitter configured to split the stored traffic file into capture files, wherein each of the capture files is specific to one service of said one or more services. The apparatus further comprises a second storage configured to store the service specific capture files, wherein each capture file is assigned an index. The apparatus further comprises an extractor configured to extract predetermined key information from the stored service specific capture files for entry points of the one or more services of the mobile telecommunications network by utilizing one or more filters configured for searching one or more strings related to the predetermined key information, wherein the key information includes at least the index assigned to the associated service specific capture file, at least one user identification, and time data. The apparatus further comprises a third storage configured to store the extracted key information in entry point specific tables.

A third aspect of the present invention is a computer program embodied on a computer readable medium. The computer program controls a data-processing device to perform the steps of:

receiving, from one or more data collectors, packet data traffic related to one or more services of a mobile telecommunications network;

storing at least a portion of the received packet data traffic in a traffic file;

splitting the stored traffic file into capture files, each of the capture files specific to one service of said one or more services;

storing the service specific capture files, with each capture file assigned an index;

extracting predetermined key information from the stored service specific capture files for entry points of the one or more services by utilizing one or more filters configured for searching one or more strings related to the predetermined key information, said key information including at least the index assigned to the associated service specific capture file, at least one user identification, and time data; and storing the extracted key information in entry point specific tables.

In an embodiment of the invention, a traffic analysis is performed utilizing at least a portion of at least one of the stored key information and the stored service specific capture files.

In an embodiment of the invention, the performing the traffic analysis comprises executing an end-to-end search on a given user identification, wherein the stored key information is searched for the given user identification and given time data, and the search results are used to select one or more entry point transactions to pass on to further analysis.

In an embodiment of the invention, the performing the traffic analysis further comprises collecting traffic statistics, wherein the number of transactions in a given service specific capture file matching a statistics filter is counted and stored for further processing.

In an embodiment of the invention, the performing the traffic analysis further comprises monitoring a given service, wherein the number of transactions in a given service specific capture file matching a first monitoring filter is counted, the number of transactions in the given service specific capture file matching a second monitoring filter is counted, and a predetermined ratio of the both numbers is compared to a predetermined threshold value to determine if sufficient network operability has been reached.

In an embodiment of the invention, the performing the traffic analysis further comprises tracking users fulfilling a given criteria, wherein the user identifications in the transactions in a given service specific capture file matching a tracking criteria filter are extracted, and a list of the extracted user identifications is generated for further processing.

In an embodiment of the invention, the services include at least one of a multimedia messaging service, a wireless application protocol related service, a short message service, an email service, a remote authentication dial in user service, and a session initiation protocol related service.

In an embodiment of the invention, the entry points include at least one of a remote authentication dial in user service entry point, a multimedia messaging service interface between the first multimedia messaging service relay/server and an external messaging system, a short message service entry point, a multimedia messaging service interface between the first multimedia messaging service relay/server and a second multimedia messaging service relay/server, a multimedia messaging service interface between the first multimedia messaging service relay/server and a value added service application of the multimedia messaging service, a Gn interface of a gateway GPRS support node, and a Gi interface of the gateway GPRS support node.

In an embodiment of the invention, the packet data service traffic is received via one or more bonded interfaces.

It is to be understood that the aspects and embodiments of the invention described above may be used in any combination with each other. Several of the aspects and embodiments may be combined together to form a further embodiment of the invention. A method, an apparatus, or a computer program which is an aspect of the invention may comprise at least one of the embodiments of the invention described above.

The invention allows analysis and monitoring for a communications network, network resources, network services and services provided over the network in real-time.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE PREFERRED EMBODIMENTS

Reference will now be made in detail to the embodiments of the invention, examples of which are illustrated in the accompanying drawings.

Figure 1A:
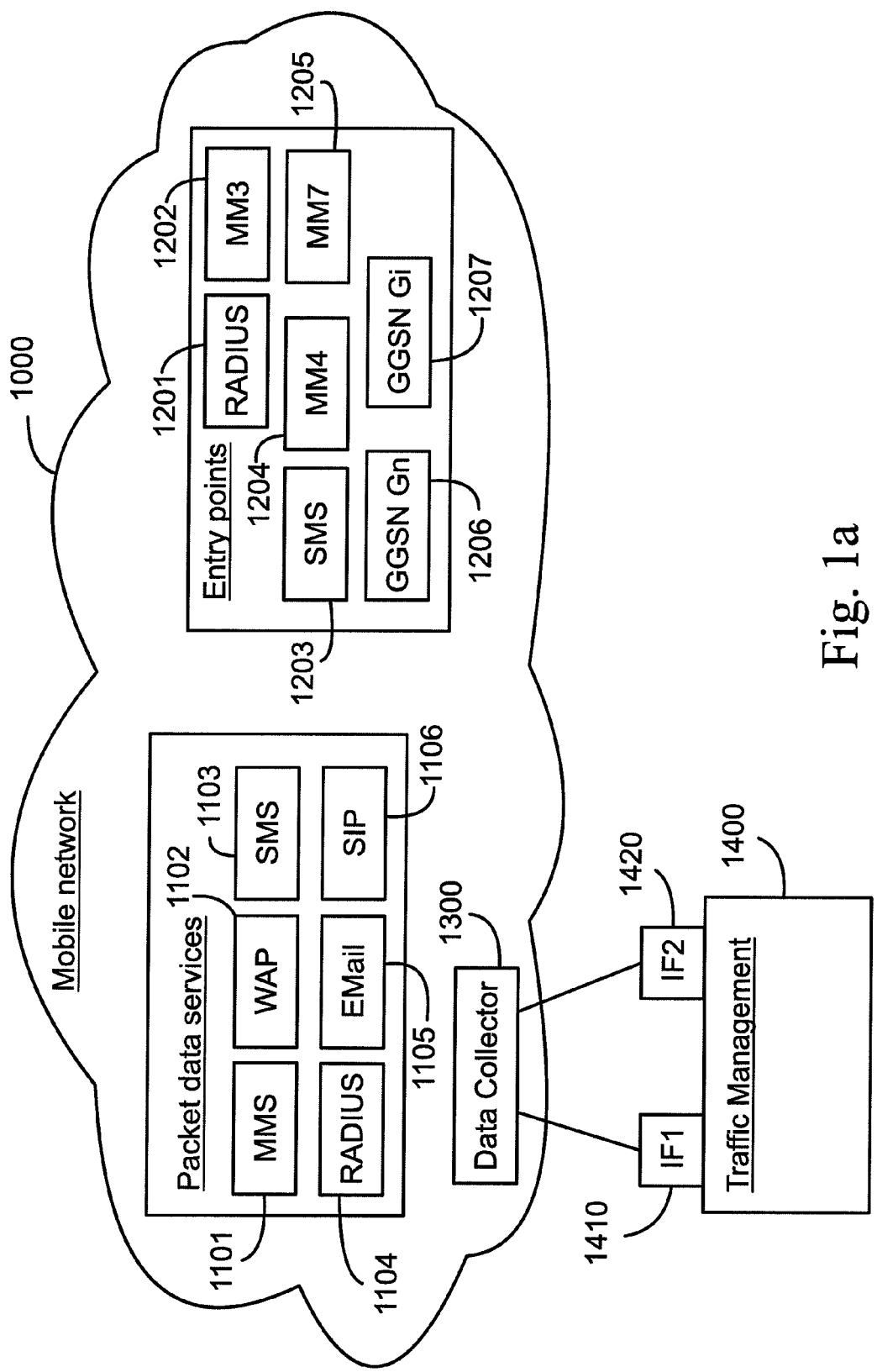
FIG. 1a is a block diagram illustrating an apparatus according to an embodiment of the invention as deployed in a mobile telecommunications network.
Figure 1B:
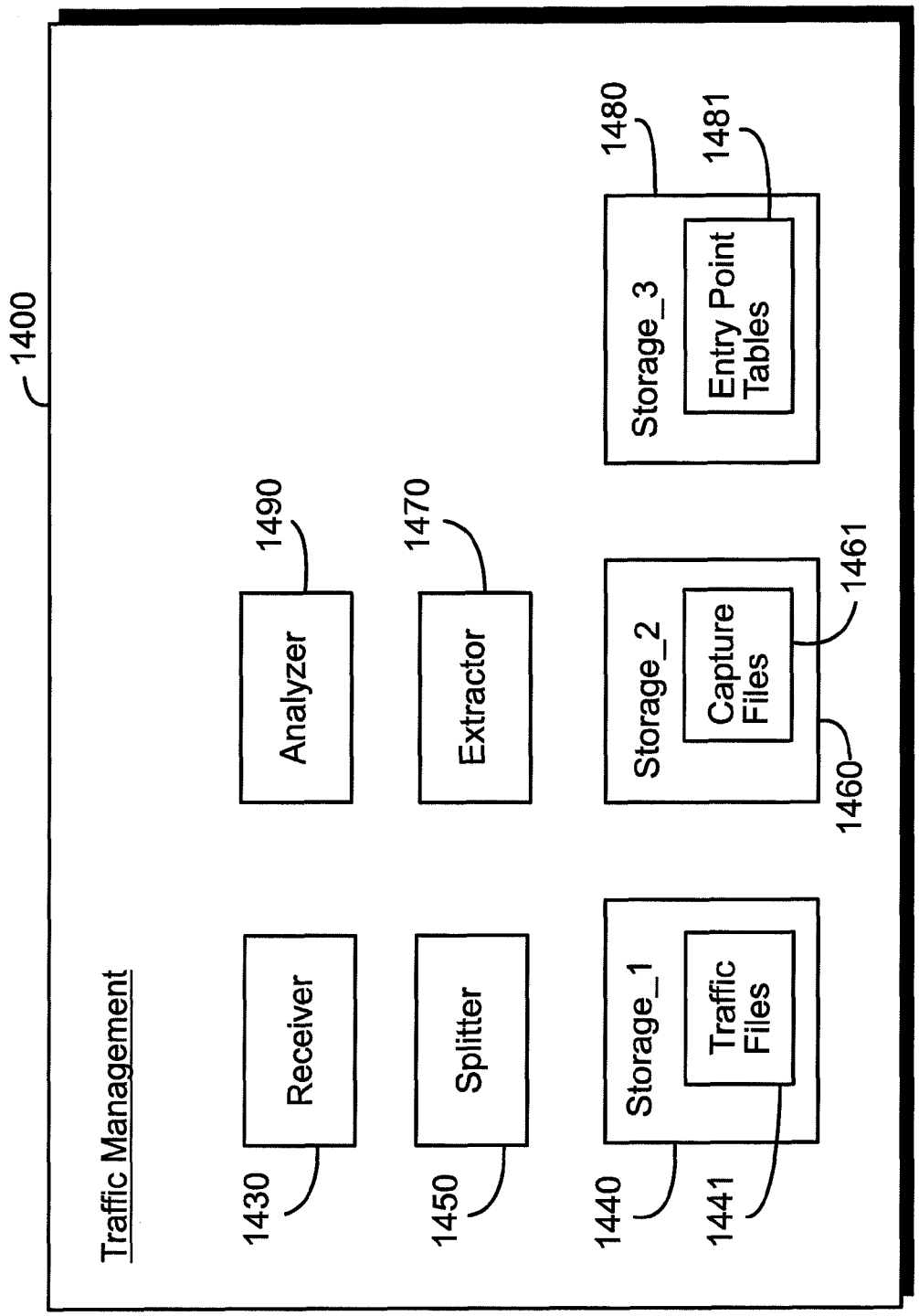
FIG. 1b is a block diagram illustrating an apparatus according to an embodiment of the invention in more detail.

FIG. 1a is a block diagram illustrating an apparatus 1400 according to an embodiment of the invention as deployed in a mobile telecommunications network 1000. FIG. 1b is a block diagram illustrating the apparatus 1400 of FIG. 1a in more detail.

The mobile telecommunications network 1000 provides various services which may include both circuit switched services and packet switched services. The circuit switched services may include e.g. conventional wireless telephony services. The packet switched services or packet data services may be implemented using e.g. General Packet Radio Service (GPRS) techniques, packet data techniques of Third Generation Partnership Project (3GPP) mobile telecommunications networks, or packet data service (CPDS) techniques of code division multiple access 2000 (CDMA2000; also known as IS-2000) mobile telecommunications networks, and the packet data services may include e.g. a multimedia messaging service (MMS) 1101, a wireless application protocol (WAP) related service 1102, a short message service (SMS) 1103 (when implemented with packet data techniques), an email service 1105, a remote authentication dial in user service (RADIUS) 1104, and/or a session initiation protocol (SIP) related service 1106 (e.g. a push-to-talk over cellular (PoC) service, a voice-over-internet protocol (VoIP) service, a video-on-demand service). Obviously, the packet data services are not limited to the above examples.

The mobile telecommunications network 1000 includes entry points. Herein, the term "entry point" is used to refer to locations in the mobile telecommunications network 1000 in which a subscriber (not illustrated in FIG. 1a) may first enter the mobile telecommunications network 1000 to use its packet data services with his/her terminal device (not illustrated in FIG. 1a). The entry points may include e.g. a remote authentication dial in user service entry point 1201 (e.g. a RADIUS request from a gateway GPRS support node (GGSN, not illustrated in FIG. 1a), from a packet data serving node (PDSN, not illustrated in FIG. 1a), from a Network Access Server (NAS) towards service network, or from an external RADIUS proxy server), a multimedia messaging service interface 1202 (also known as MM3 interface in the art of multimedia messaging service) between the first multimedia messaging service relay/server and an external messaging system (not illustrated in FIG. 1a), a short message service entry point 1203, a multimedia messaging service interface 1204 (also known as MM4 interface in the art of multimedia messaging service) between the first multimedia messaging service relay/server and a second multimedia messaging service relay/server (not illustrated in FIG. 1a), a multimedia messaging service interface 1205 (also known as MM7 interface in the art of multimedia messaging service) between the first multimedia messaging service relay/server and a value added service (VAS) application (not illustrated in FIG. 1a) of the multimedia messaging service, a Gn interface 1206 of a gateway GPRS support node, and/or a Gi interface 1207 of the gateway GPRS support node. Obviously, the entry points are not limited to the above examples. For example, in place of the MM7 interface, an external application interface (EAIF) may used.

The RADIUS entry point 1201 may be used for e.g. MMS MM1 traffic and WAP browsing traffic. The Gn interface 1206 of the GGSN may be used for e.g. mobile internet browsing. For SIP services, e.g. the Gn interface 1206 of the GGSN or the Gi interface 1207 of the GGSN may be used. The MM3 interface 1202 may be used e.g. by the MMS Relay/Server to send multimedia messages to and retrieve multimedia messages from servers of external messaging systems that are connected to the service provider's MMS Relay/Server. The MM4 interface 1204 between MMS Relay/Servers belonging to different multimedia messaging service environments (MMSE) may be used e.g. to transfer messages between them. The MM7 interface 1205 may be used e.g. to transfer multimedia messages from MMS Relay/Server to MMS VAS applications and to transfer multimedia messages from MMS VAS applications to MMS Relay/Server.

The mobile telecommunications network 1000 further includes a data collector 1300. In an embodiment of the invention, the data collector 1300 may comprise a network node 1300 that is capable of port monitoring. In the embodiment of FIG. 1a, the network node 1300 is a network switch capable of port monitoring. However, the network node 1300 may also be e.g. a router, a load balancer, a network tap, or a service node capable of port monitoring. The port monitoring capability may be implemented e.g. as a port mirroring capability. Since both port mirroring and port monitoring are concepts known in the art, they are not described in more detail herein. Furthermore, even though only one network node 1300 capable of port monitoring is illustrated in FIG. 1a for the sake of clarity, it is to be understood that multiple network nodes capable of port monitoring may be used for the purposes of the present invention.

The apparatus 1400 is connected to the network node 1300. In the embodiment of FIG. 1a, the apparatus 1400 is connected to the network node 1300 via bonded interfaces 1410, 1420. In the art, bonded interfaces are also known as IP-multipathing and interface aggregates. Again, since the bonded interface is a concept known in the art, it is not described in more detail herein. In an embodiment, no internet protocol (IP) addresses are configured for the bonded interfaces 1410, 1420. Furthermore, even though only two bonded interfaces 1410, 1420 are illustrated in FIG. 1a for the sake of clarity, it is to be understood that any number of bonded interfaces may be used per each apparatus 1400 for the purposes of the present invention. Similarly, any number of network nodes capable of port monitoring may be connected to each apparatus 1400 for the purposes of the present invention. Finally, any number of apparatuses 1400 may be used for the purposes of the present invention.

Using bonded interfaces has several advantages. For example, monitored traffic data can be received from multiple locations at the same time and be captured by a single capturing process. Furthermore, time stamps of the traffic don't need synchronization because only one capturing process is running to capture traffic data from multiple locations, and local system time is used as a time value for captured traffic. Therefore, all the captured packets are stored in chronological order by default. Furthermore, when network nodes are redundant (doubled), it is possible to receive traffic from a primary and a secondary node at the same time with interface bonding. On the other hand, if all the monitored service data is received from a single non-redundant node, interface bonding is not needed.

Alternatively, instead of implementing the data collector 1300 in a network node remote from the packet data services 1101-1106 as illustrated in FIG. 1a, the data collector 1300 may also be arranged locally, i.e. in connection with (not illustrated in FIG. 1a) one or more of the packet data services 1101-1106. Again, there may be multiple data collectors 1300, each of which may be arranged e.g. in connection with one of the packet data services 1101-1106. In this embodiment, the data collector(s) 1300 may be e.g. software module(s), each of which may be installed in connection with one of the packet data services 1101-1106 and each of which may collect packet data traffic related to its respective packet data service 1101-1106.

The apparatus 1400 comprises a receiver 1430 that is configured to receive (typically via the bonded interfaces 1410, 1420, as described above) packet data traffic related to one or more of the services 1101-1106 of the mobile telecommunications network 1000 from the data collector 1300. In the above embodiment in which the data collector 1300 is arranged locally in connection with one of the packet data services 1101-1106, the receiver 1430 may be configured to receive the packet data traffic related to one or more of the services 1101-1106 e.g. via file transfer protocol (FTP) or via volume mounting, both of which are techniques well known to a person skilled in the art and therefore do not need to be described in further detail herein.

The apparatus 1400 further comprises a first storage 1440 that is configured to store at least a portion of the received packet data traffic in a traffic file 1441. In an embodiment, the traffic files 1441 may be created using a ring buffer (not illustrated in FIG. 1b). Furthermore, the traffic files 1441 may be created based on e.g. duration, file size, and/or the number of files.

The apparatus 1400 further comprises a splitter 1450 that is configured to split the stored traffic file into capture files 1461, wherein each of the capture files 1461 is specific to one service of the one or more services 1101-1106.

The apparatus 1400 further comprises a second storage 1460 that is configured to store the service specific capture files 1461. Each capture file may be assigned an index. The index may be e.g. an incremental file index number. As a result, the traffic file 1441 is split into small logical pieces (i.e. the capture files 1461) specific to the packet data services 1101-1106.

The apparatus 1400 further comprises an extractor 1470 that is configured to extract predetermined key information from the stored service specific capture files 1461 for entry points 1201-1207 by utilizing one or more filters configured for searching one or more strings (e.g. character strings) related to the predetermined key information. The key information may include the index assigned to the associated service specific capture file, user identifications, and/or time data. The apparatus 1400 further comprises a third storage 1480 (e.g. a database) that is configured to store the extracted key information in tables 1481 each of which may be specific to one of the entry points 1201-1205.

It is to be understood that in the context of the present invention, the term "user" is used to refer to an entity using a packet data service(s). That is, the term "user" refers to at least one of a subscriber and a terminal device using the packet data service(s). Accordingly, the "user identification" may comprise at least one of a subscriber identification and a terminal device identification, such as at least one of a mobile subscriber integrated services digital network number (MSISDN), a mobile identification number (MIN), an international mobile subscriber identity (IMSI), an electronic serial number (ESN) of the terminal device, and an internet protocol (IP) address.

It is to be understood that the first storage 1440, the second storage 1460 and the third storage 1480 may be implemented separately from each other (as illustrated in FIG. 1b) or in any combination with each other.

The apparatus 1400 further comprises an analyzer 1490 that is configured to perform a traffic analysis utilizing information stored in the entry point specific tables 1481 and/or the capture files 1461. Various examples of this traffic analysis will be described in more detail in connection with FIGS. 3a-3d.

Figure 2:
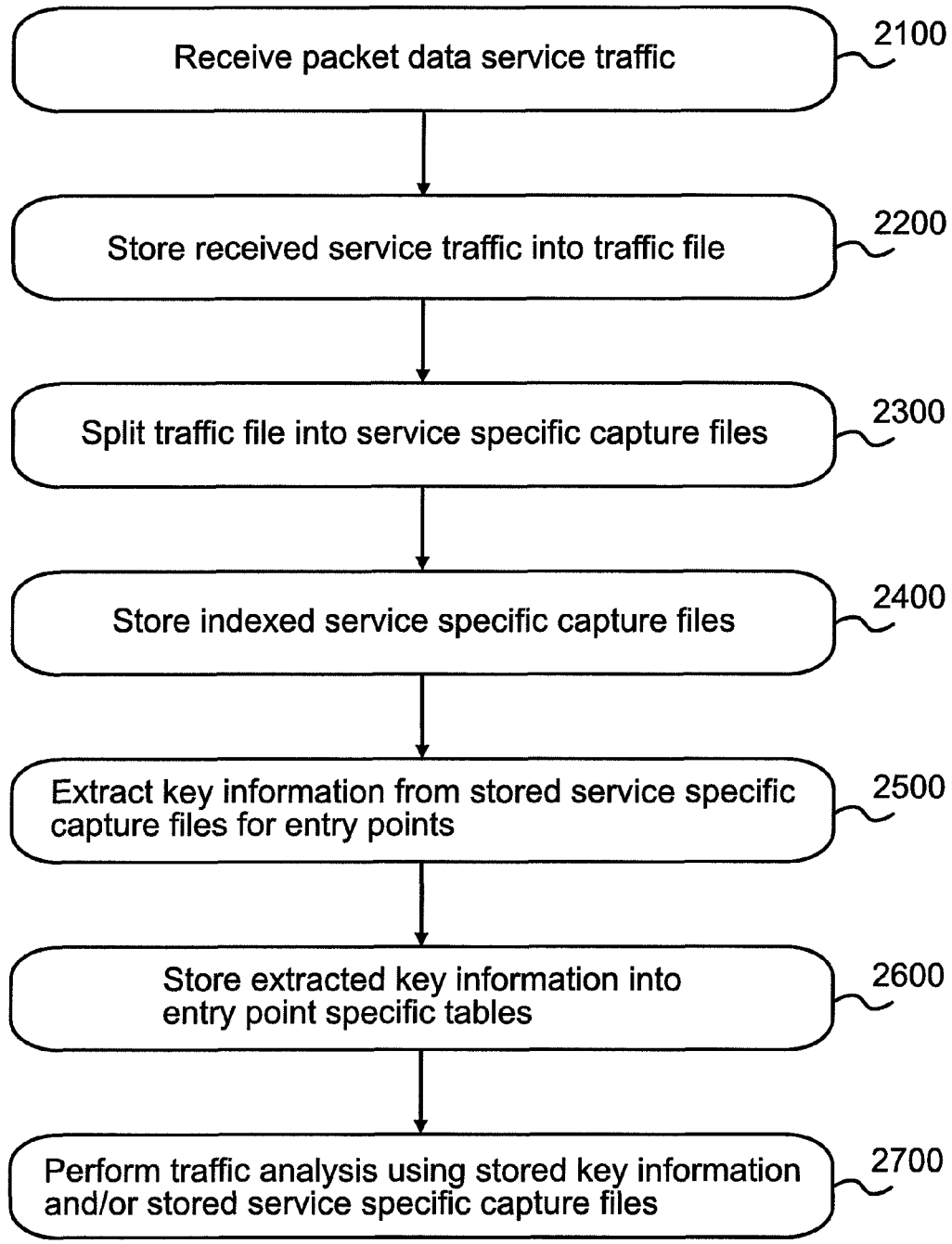
FIG. 2 is a flow diagram illustrating a method according to an embodiment of the invention.

FIG. 2 is a flow diagram illustrating a method according to an embodiment of the invention. At step 2100, packet data traffic related to one or more services of a mobile telecommunications network is received from one or more data collectors. The received packet data traffic is stored in a traffic file, step 2200. At step 2300, the stored traffic file is split into capture files, wherein each of the capture files is specific to one service of the one or more services of the mobile telecommunications network. At step 2400, the service specific capture files are stored, wherein each capture file is assigned an index. At step 2500, predetermined key information is extracted from the stored service specific capture files for entry points of the one or more services of the mobile telecommunications network by utilizing one or more filters configured for searching one or more strings related to the predetermined key information, wherein the key information includes at least the index assigned to the associated service specific capture file, at least one user identification, and time data. The extracted key information is stored in entry point specific tables, step 2600. At optional step 2700, a traffic analysis is performed utilizing at least a portion of at least one of the stored key information and the stored service specific capture files.

Figure 3A:
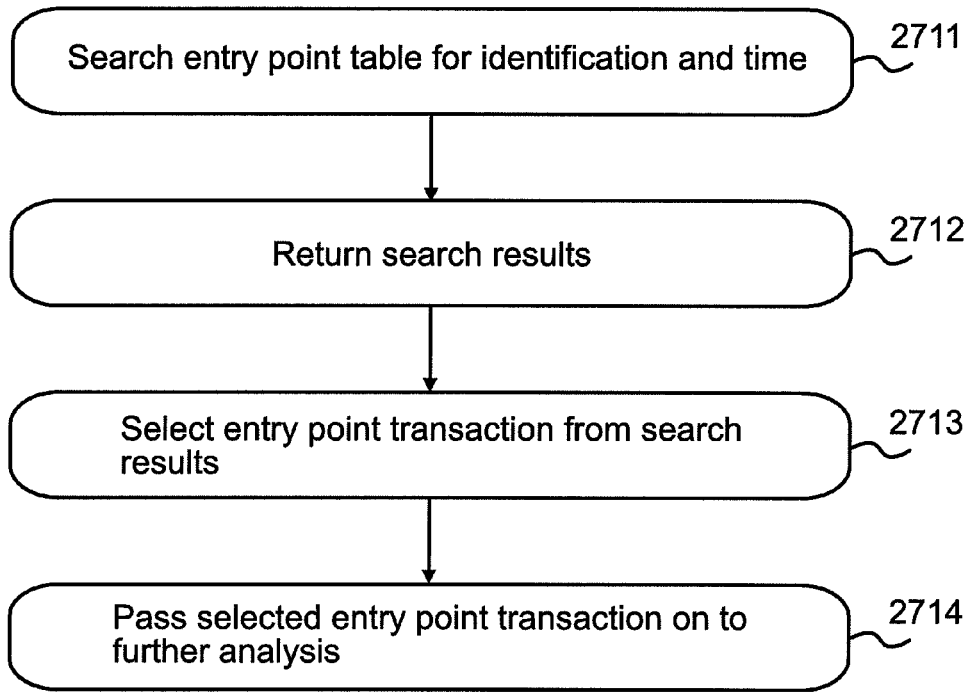
FIG. 3a is a flow diagram illustrating a method according to another embodiment of the invention.

FIGS. 3a-3d are flow diagrams illustrating embodiments of the analysis step 2700 of the method of FIG. 2. FIG. 3a illustrates a case in which the at least one user identification may comprise e.g. a mobile subscriber integrated services digital network number (MSISDN), and the performing the traffic analysis comprises executing an end-to-end search on a given MSISDN (i.e. executing a trace). Key information stored in the table 1481 specific to a desired one of the entry points 1201-1205 is searched for the given MSISDN and given time data, step 2711. Search results are returned, step 2712. At step 2713, the returned search results are used to select one or more entry point transactions for detailed further analysis. At step 2714, the selected entry point transactions are passed on to the detailed further analysis. The detailed further analysis may be performed using known traffic analysis techniques. Furthermore, the embodiment of FIG. 3a may also be used to enable lawful authorities to effectively run various tasks required for data monitoring and surveillance. It is to be understood that the embodiment of FIG. 3a is not limited to mobile subscriber integrated services digital network numbers (MSISDNs). For example, the at least one user identification may comprise one of mobile identification numbers (MINs), international mobile subscriber identities (IMSIs), electronic serial numbers (ESNs), and IP-addresses instead of mobile subscriber integrated services digital network numbers.

Figure 3B:
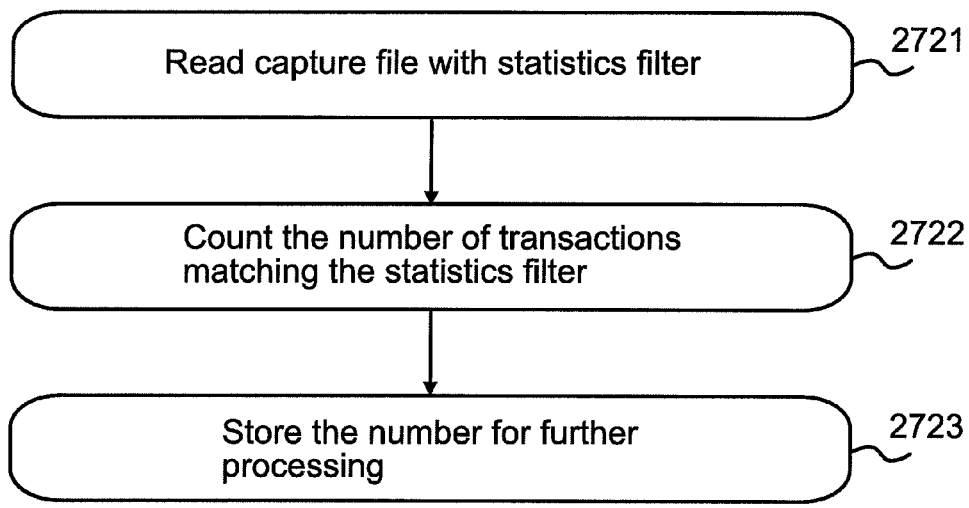
FIG. 3b is a flow diagram illustrating a method according to yet another embodiment of the invention.

FIG. 3b illustrates a case in which the performing the traffic analysis further comprises collecting traffic statistics. A respective capture file is read with a statistics filter, step 2721. At step 2722, the number of transactions in the respective capture file matching the used statistics filter is counted. The counted number is then stored for further processing, step 2723. The traffic statistics collected in this manner may include e.g. service related statistics (e.g. number of requests, number of responses, and/or number of successful transactions), terminal type statistics, content size statistics, and/or network related statistics (e.g. round trip time, packet count, and/or number of broadcasts).

Figure 3C:
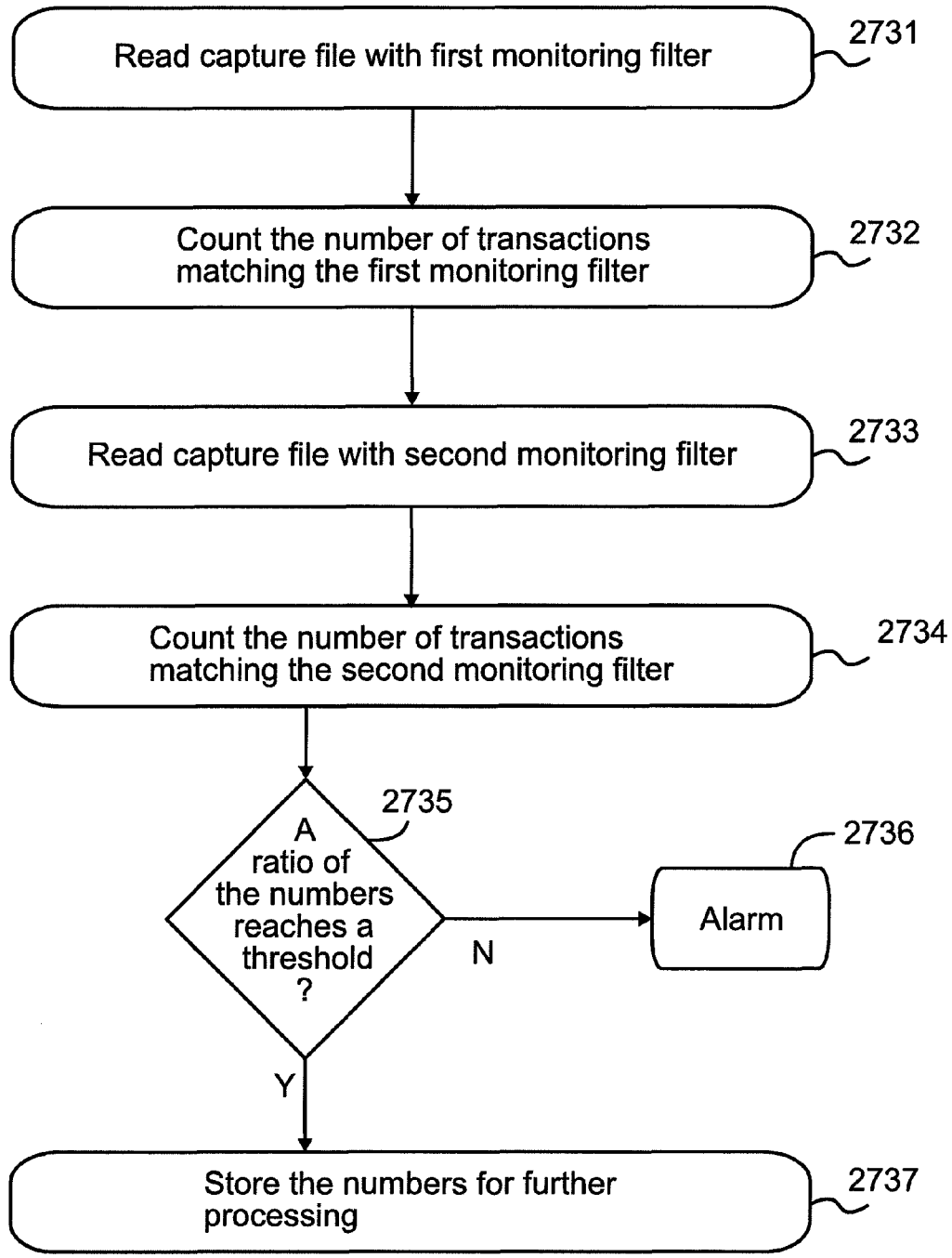
FIG. 3c is a flow diagram illustrating a method according to a further embodiment of the invention.

FIG. 3c illustrates a case in which the performing the traffic analysis further comprises monitoring a given service 1101, 1102, 1103, 1104, 1105 or 1106 (for example, to find out if the given service is operating sufficiently). A respective capture file (that is, a capture file related to the given service 1101, 1102, 1103, 1104, 1105 or 1106) is read with a first monitoring filter, step 2731. The number of transactions in the respective capture file matching the first monitoring filter is counted, step 2732. The respective capture file is read with a second monitoring filter, step 2733. In another embodiment, another capture file may be read with the second monitoring filter. The number of transactions in the respective capture file matching the second monitoring filter is counted, step 2734. At step 2735, a predetermined ratio of the both numbers counted at steps 2732 and 2734 is compared to a predetermined threshold value to determine if sufficient network operability has been reached. If it is determined at step 2735 that the threshold value is not reached, it may be determined that sufficient network operability has not been reached, and e.g. an alarm may be given, step 2736. If it is determined at step 2735 that the threshold value is reached, it may be determined that sufficient network operability has been reached, and the numbers may e.g. be stored for further processing, step 2737.

In an example of the embodiment of FIG. 3c, the first monitoring filter may be used to count the number of profile requests, and the second monitoring filter may be used to count the number of successfully executed profile responses. In other words, the invention allows performing service monitoring on the seventh layer (i.e. application layer) of the Open Systems Interconnection (OSI) reference model thereby allowing viewing application layer information rather than merely the number of transactions. The threshold value may be e.g. 90%. The predetermined ratio of the counted numbers may be e.g. the ratio of the number of profile requests to the number of profile responses. Therefore, it may be determined e.g. that if the number of profile requests/the number of profile responses equals or exceeds 90%, then sufficient network operability has been reached. Otherwise, sufficient network operability has not been reached.

Figure 3D:
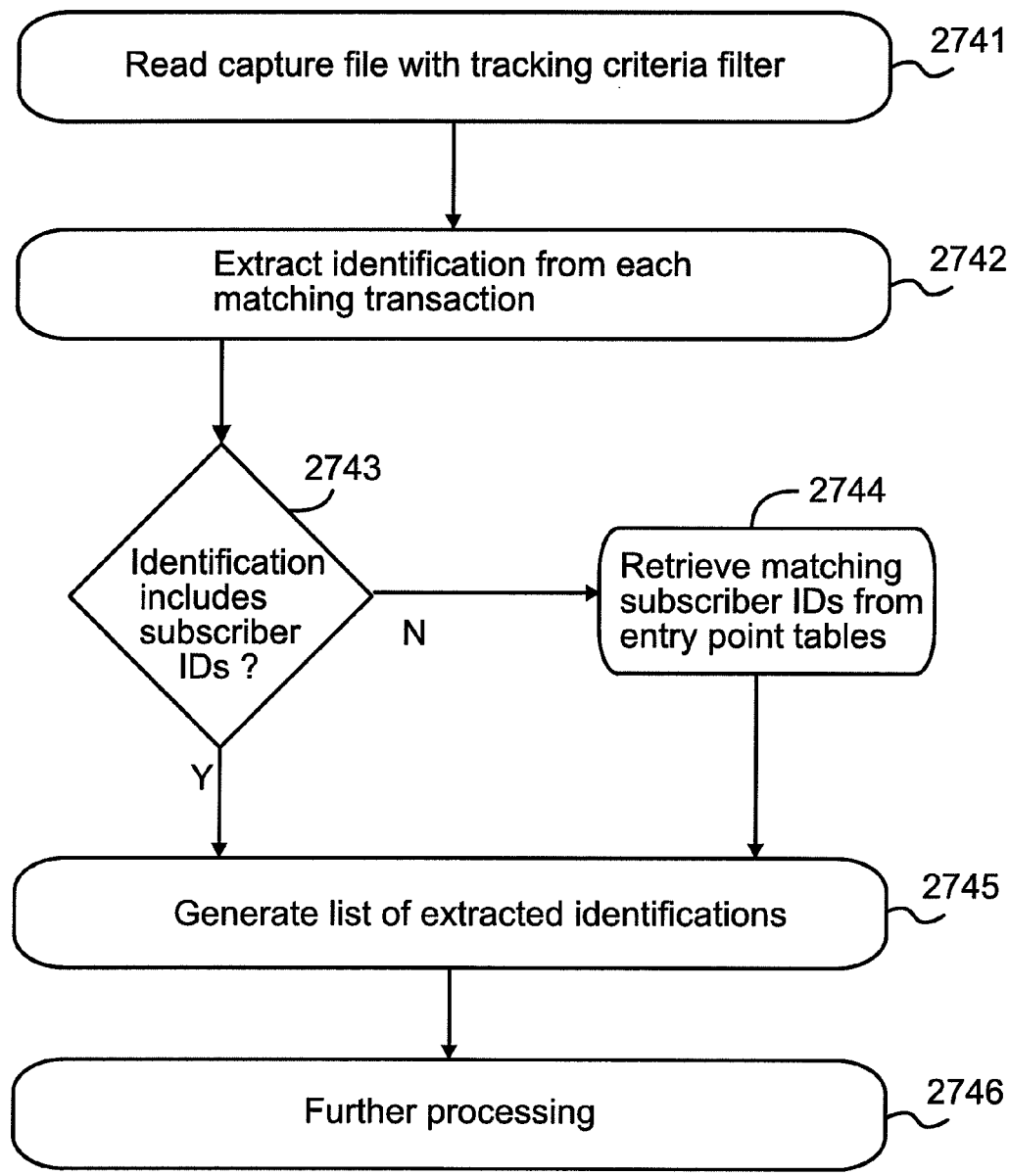
FIG. 3d is a flow diagram illustrating a method according to another further embodiment of the invention.

FIG. 3d illustrates a case in which the performing the traffic analysis further comprises tracking users fulfilling a given criteria. A respective capture file is read with a tracking criteria filter, step 2741. The user identifications (e.g. MSISDNs, MINs, IMSIs, ESNs, or IP-addresses) in the transactions in the respective capture file matching the tracking criteria filter are extracted, step 2742. At optional step 2743 it may be checked whether the user identifications include subscriber identifications, such as e.g. MSISDNs or MINs. If the user identifications do not include subscriber identifications, they may include e.g. IP addresses which will allow retrieving the subscriber identifications matching the IP addresses from the entry point specific tables, step 2744. At step 2745, a list of the extracted (or retrieved) user identifications is generated for further processing of step 2746. Examples of tracking criteria include subscribers who do not have credit on their prepaid account, subscribers who tried to use a given service and succeeded/failed, subscribers who have used a given service, subscribers who have a given virus in their mobile terminal device, subscribers who are using a mobile terminal device provided by a specific vendor and/or with a specific software version, subscribers who are using the telecommunications network at a given time, and/or subscribers who are sending messages to a recipient or recipients under a given network operator.

Furthermore, the embodiment of FIG. 3d may be utilized for personalized advertising targeting in real-time that is based on actual subscriber activities and therefore significantly more accurate than prior art advertising targeting. Information used in such advertising targeting may include e.g. time (used to trigger delivery), subscriber status (currently active or passive), keywords (content containing one or more specified keywords), activity (browsing destination and multimedia message characteristics), profile (available profile information, such as terminal type, terminal capability, subscriber profile), and location of the subscribers.

The apparatus 1400 as well as the methods of FIGS. 2 and 3a-3d may be implemented as software, firmware, hardware, or any combination thereof. Furthermore, they may be implemented as one or more separate entities, or they may be integrated with other entities of the mobile telecommunications network 1000.

The exemplary embodiments can include, for example, any suitable servers, workstations, PCs, laptop computers, personal digital assistants (PDAs), Internet appliances, handheld devices, cellular telephones, smart phones, wireless devices, other devices, and the like, capable of performing the processes of the exemplary embodiments. The devices and subsystems of the exemplary embodiments can communicate with each other using any suitable protocol and can be implemented using one or more programmed computer systems or devices.

One or more interface mechanisms can be used with the exemplary embodiments, including, for example, Internet access, telecommunications in any suitable form (e.g., voice, modem, and the like), wireless communications media, and the like. For example, employed communications networks or links can include one or more wireless communications networks, cellular communications networks, 3 G communications networks, Public Switched Telephone Network (PSTNs), Packet Data Networks (PDNs), the Internet, intranets, a combination thereof, and the like.

It is to be understood that the exemplary embodiments are for exemplary purposes, as many variations of the specific hardware used to implement the exemplary embodiments are possible, as will be appreciated by those skilled in the hardware and/or software art(s). For example, the functionality of one or more of the components of the exemplary embodiments can be implemented via one or more hardware and/or software devices.

The exemplary embodiments can store information relating to various processes described herein. This information can be stored in one or more memories, such as a hard disk, optical disk, magneto-optical disk, RAM, and the like. One or more databases can store the information used to implement the exemplary embodiments of the present inventions. The databases can be organized using data structures (e.g., records, tables, arrays, fields, graphs, trees, lists, and the like) included in one or more memories or storage devices listed herein. The processes described with respect to the exemplary embodiments can include appropriate data structures for storing data collected and/or generated by the processes of the devices and subsystems of the exemplary embodiments in one or more databases.

All or a portion of the exemplary embodiments can be conveniently implemented using one or more general purpose processors, microprocessors, digital signal processors, micro-controllers, and the like, programmed according to the teachings of the exemplary embodiments of the present inventions, as will be appreciated by those skilled in the computer and/or software art(s). Appropriate software can be readily prepared by programmers of ordinary skill based on the teachings of the exemplary embodiments, as will be appreciated by those skilled in the software art. In addition, the exemplary embodiments can be implemented by the preparation of application-specific integrated circuits or by interconnecting an appropriate network of conventional component circuits, as will be appreciated by those skilled in the electrical art(s). Thus, the exemplary embodiments are not limited to any specific combination of hardware and/or software.

Stored on any one or on a combination of computer readable media, the exemplary embodiments of the present inventions can include software for controlling the components of the exemplary embodiments, for driving the components of the exemplary embodiments, for enabling the components of the exemplary embodiments to interact with a human user, and the like. Such software can include, but is not limited to, device drivers, firmware, operating systems, development tools, applications software, and the like. Such computer readable media further can include the computer program product of an embodiment of the present inventions for performing all or a portion (if processing is distributed) of the processing performed in implementing the inventions. Computer code devices of the exemplary embodiments of the present inventions can include any suitable interpretable or executable code mechanism, including but not limited to scripts, interpretable programs, dynamic link libraries (DLLs), Java classes and applets, complete executable programs, Common Object Request Broker Architecture (CORBA) objects, and the like. Moreover, parts of the processing of the exemplary embodiments of the present inventions can be distributed for better performance, reliability, cost, and the like.

As stated above, the components of the exemplary embodiments can include computer readable medium or memories for holding instructions programmed according to the teachings of the present inventions and for holding data structures, tables, records, and/or other data described herein. Computer readable medium can include any suitable medium that participates in providing instructions to a processor for execution. Such a medium can take many forms, including but not limited to, non-volatile media, volatile media, trans-mission media, and the like. Non-volatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CDR, CD-RW, DVD, DVD-ROM, DVD±RW, DVD±R, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave or any other suitable medium from which a computer can read.

While the present inventions have been described in connection with a number of exemplary embodiments, and implementations, the present inventions are not so limited, but rather cover various modifications, and equivalent arrangements, which fall within the purview of prospective claims.

The invention claimed is:

1. A method of managing mobile telecommunications packet data service traffic, comprising:
   receiving, from one or more data collectors, packet data traffic related to one or more services of a mobile telecommunications network;
   wherein the method further comprises:
      storing at least a portion of the received packet data traffic in a traffic file;
   splitting the stored traffic file into capture files, each of the capture files specific to one service of said one or more services;
      storing the service specific capture files, with each capture file assigned an index;
   extracting predetermined key information from the stored service specific capture files for entry points of said one or more services by utilizing one or more filters configured for searching one or more strings related to said predetermined key in-formation, said key information including at least the index assigned to the associated service specific capture file, at least one user identification, and time data; and
      storing the extracted key information in entry point specific tables.

2. The method according to claim 1, wherein the method further comprises performing a traffic analysis utilizing at least a portion of at least one of the stored key in-formation and the stored service specific capture files.

3. The method according to claim 2, wherein the performing the traffic analysis further comprises executing an end-to-end search on a given user identification, wherein the stored key information is searched for the given user identification and given time data, and the search results are used to select one or more entry point transactions to pass on to further analysis.

4. The method according to claim 2, wherein the performing the traffic analysis further comprises collecting traffic statistics, wherein the number of transactions in a given service specific capture file matching a statistics filter is counted and stored for further processing.

5. The method according to claim 2, wherein the performing the traffic analysis further comprises monitoring a given service, wherein the number of transactions in a given service specific capture file matching a first monitoring filter is counted, the number of transactions in the given service specific capture file matching a second monitoring filter is counted, and a predetermined ratio of the both numbers is compared to a predetermined threshold value to determine if sufficient network operability has been reached.

6. The method according to claim 2, wherein the performing the traffic analysis further comprises tracking users fulfilling a given criteria, wherein user identifications in the transactions in a given service specific capture file matching a tracking criteria filter are extracted, and a list of the extracted user identifications is generated for further processing.

7. The method according to claim 1, wherein the services include at least one of a multimedia messaging service, a wireless application protocol related service, a short message service, a remote authentication dial in user service, an email service, and a session initiation protocol related service.

8. The method according to claim 1, wherein the entry points include at least one of a remote authentication dial in user service entry point, a multimedia messaging service interface between the first multimedia messaging service relay/server and an external messaging system, a short message service entry point, a multimedia messaging service interface between the first multimedia messaging service relay/server and a second multimedia messaging service relay/server, a multimedia messaging service interface between the first multimedia messaging service relay/server and a value added service application of the multimedia messaging service, a Gn interface of a gateway GPRS support node, and a Gi interface (1207) of the gateway GPRS support node.

9. An apparatus for managing mobile telecommunications packet data service traffic, comprising:
   a receiver configured to receive, from one or more data collectors, packet data traffic related to one or more services of a mobile telecommunications network;
   wherein the apparatus further comprises:
   a first storage configured to store at least a portion of the received packet data traffic in a traffic file;
   a splitter configured to split the stored traffic file into capture files, each of the capture files specific to one service of said one or more services;
   a second storage configured to store the service specific capture files, with each capture file assigned an index;
   an extractor configured to extract predetermined key information from the stored service specific capture files for entry points of said one or more services by utilizing one or more filters configured for searching one or more strings related to said predetermined key information, said key information including at least the index assigned to the associated service specific capture file, at least one user identification, and time data; and
   a third storage configured to store the extracted key information in entry point specific tables.

10. The apparatus according to claim 9, wherein the apparatus further comprises an analyzer configured to perform a traffic analysis utilizing at least a portion of at least one of the stored key information and the stored service specific capture files.

11. The apparatus according to claim 10, wherein the analyzer is further configured to perform the traffic analysis by executing an end-to-end search on a given user identification, wherein the stored key information is searched for the given user identification and given time data, and the search results are used to select one or more entry point transactions to pass on to further analysis.

12. The apparatus according to claim 10, wherein the analyzer is further configured to perform the traffic analysis by collecting traffic statistics, wherein the number of transactions in a given service specific capture file matching a statistics filter is counted and stored for further processing.

13. The apparatus according to claim 10, wherein the analyzer is further configured to perform the traffic analysis by monitoring a given service, wherein the number of transactions in a given service specific capture file matching a first monitoring filter is counted, the number of transactions in the given service specific capture file matching a second monitoring filter is counted, and a predetermined ratio of the both numbers is compared to a pre-determined threshold value to determine if sufficient network operability has been reached.

14. The apparatus according to claim 10, wherein the analyzer is further configured to perform the traffic analysis by tracking users fulfilling a given criteria, wherein the user identifications in the transactions in a given service specific capture file matching a tracking criteria filter are extracted, and a list of the extracted user identifications is generated for further processing.

15. The apparatus according to claim 9, wherein the apparatus further comprises one or more bonded interfaces via which the packet data service traffic is received.

16. A computer program embodied on a non-transitory computer readable medium, the computer program controlling a data-processing device to perform the steps of:

receiving, from one or more data collectors, packet data traffic related to one or more services of a mobile telecommunications network;

wherein the computer program further controls the data-processing device to perform the steps of:

storing at least a portion of the received packet data traffic in a traffic file;

splitting the stored traffic file into capture files, each of the capture files specific to one service of said one or more services;

storing the service specific capture files, with each capture file assigned an index;

extracting predetermined key information from the stored service specific capture files for entry points of said one or more services by utilizing one or more filters configured for searching one or more strings related to said predetermined key information, said key information including at least the index assigned to the associated service specific capture file, at least one user identification, and time data; and storing the extracted key information in entry point specific tables.

* * * * *